(12) United States Patent
Cheng et al.

(10) Patent No.: US 12,481,561 B2
(45) Date of Patent: Nov. 25, 2025

(54) METHOD, DEVICE, AND COMPUTER PROGRAM PRODUCT FOR DATA BACKUP

(71) Applicant: DELL PRODUCTS L.P., Round Rock, TX (US)

(72) Inventors: Qianyun Cheng, Chengdu (CN); Mengze Liao, Shanghai (CN); Xiaoliang Zhu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/204,600

(22) Filed: Jun. 1, 2023

(65) Prior Publication Data

US 2024/0320101 A1 Sep. 26, 2024

(30) Foreign Application Priority Data

Mar. 23, 2023 (CN) .......................... 202310293153.9

(51) Int. Cl.
*G06F 16/22* (2019.01)
*G06F 11/14* (2006.01)

(52) U.S. Cl.
CPC ...... *G06F 11/1458* (2013.01); *G06F 2201/84* (2013.01)

(58) Field of Classification Search
None
See application file for complete search history.

(56) References Cited

U.S. PATENT DOCUMENTS

| 5,522,037 A | * | 5/1996 | Kitagawa | G06F 11/1469 |
| | | | | 714/E11.122 |
| 2007/0106710 A1 | * | 5/2007 | Haustein | G06F 3/0605 |
| 2008/0086658 A1 | * | 4/2008 | Takahasi | G06F 11/1464 |
| | | | | 714/E11.121 |
| 2008/0208929 A1 | * | 8/2008 | Phillipi | G06F 11/1464 |

(Continued)

FOREIGN PATENT DOCUMENTS

| CN | 110955563 A | * | 4/2020 | |
| CN | 112527559 A | * | 3/2021 | .......... G06F 11/1448 |

(Continued)

*Primary Examiner* — Augustine K. Obisesan
(74) *Attorney, Agent, or Firm* — WOMBLE BOND DICKINSON (US) LLP

(57) ABSTRACT

Embodiments of the present disclosure relate to a method, a device, and a computer program product for data backup. The method includes determining a group of backup tasks for backing up a data object. The method further includes determining, based on backup types of backup tasks in the group of backup tasks, whether there are a plurality of backup tasks capable of being combined in the group of backup tasks. The method further includes determining, in response to determining that there are a plurality of backup tasks capable of being combined in the group of backup tasks, a combined backup task for the plurality of backup tasks. The method further includes backing up the data object by using the combined backup task. This method can reduce the amount of data that needs to be backed up, thereby reducing the use of computing resources and storage resources, reducing the impact on a production environment of a user, and improving the user experience.

20 Claims, 5 Drawing Sheets

(56) References Cited

U.S. PATENT DOCUMENTS

| | | | | |
|---|---|---|---|---|
| 2012/0110584 A1* | 5/2012 | Chaudhry | | G06F 9/5027 |
| | | | | 718/102 |
| 2012/0117028 A1* | 5/2012 | Gold | | G06F 11/1458 |
| | | | | 707/640 |
| 2020/0250047 A1* | 8/2020 | Pascale | | G06F 11/1464 |
| 2021/0182154 A1* | 6/2021 | Liao | | G06F 11/1469 |
| 2021/0255926 A1* | 8/2021 | Wang | | G06N 5/04 |
| 2023/0096071 A1* | 3/2023 | Sarkar | | G06F 11/1451 |
| | | | | 714/6.3 |
| 2023/0153207 A1* | 5/2023 | Natanzon | | G06F 11/1461 |
| | | | | 707/654 |

FOREIGN PATENT DOCUMENTS

| | | | | | |
|---|---|---|---|---|---|
| CN | 112685224 A | * | 4/2021 | | G06F 11/1451 |
| CN | 114077590 A | * | 2/2022 | | |
| CN | 113032185 B | * | 3/2024 | | G06F 11/1448 |
| DE | 202011110892 U1 | * | 3/2017 | | G06F 11/008 |

* cited by examiner

METHOD, DEVICE, AND COMPUTER PROGRAM PRODUCT FOR DATA BACKUP

CROSS-REFERENCE TO RELATED APPLICATION

This patent application claims priority, under 35 U.S.C. § 119, of Chinese Patent Application No. 202310293153.9, filed Mar. 23, 2023, which is incorporated by reference in its entirety.

TECHNICAL FIELD

Embodiments of the present disclosure generally relate to the field of data processing, and in particular, to a method, a device, and a computer program product for data backup.

BACKGROUND

With the development of computer technologies, more and more computer devices are used. During the use of a computer, a lot of data will be generated. Sometimes, data generated by the computer is very important to a user, and therefore, the data needs to be backed up to ensure data security.

For data backup, a user may configure a backup policy for a data object, and therefore, there are a plurality of types of backup tasks for the same data object, such as weekly full backups for a virtual machine, daily synthetic full backups for a virtual machine, and hourly log backups for applications in a virtual machine. The security of the data object is ensured through a plurality of types of backups. However, there are many issues to be addressed during the plurality of types of backups for the data object.

SUMMARY OF THE INVENTION

Embodiments of the present disclosure provide a method, a device, and a computer program product for data backup.

In a first aspect of the present disclosure, a method for data backup is provided. The method includes determining a group of backup tasks for backing up a data object. The method further includes determining, based on backup types of backup tasks in the group of backup tasks, whether there are a plurality of backup tasks capable of being combined in the group of backup tasks. The method further includes determining, in response to determining that there are a plurality of backup tasks capable of being combined in the group of backup tasks, a combined backup task for the plurality of backup tasks. The method further includes backing up the data object by using the combined backup task.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: determining a group of backup tasks for backing up a data object; determining, based on backup types of backup tasks in the group of backup tasks, whether there are a plurality of backup tasks capable of being combined in the group of backup tasks; determining, in response to determining that there are a plurality of backup tasks capable of being combined in the group of backup tasks, a combined backup task for the plurality of backup tasks; and backing up the data object by using the combined backup task.

According to a third aspect of the present disclosure, a computer program product is provided. The computer program product is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein identical reference numerals generally represent identical components in the example embodiments of the present disclosure.

In the accompanying drawings, identical or corresponding reference numerals represent identical or corresponding parts.

DETAILED DESCRIPTION

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Figure 1:
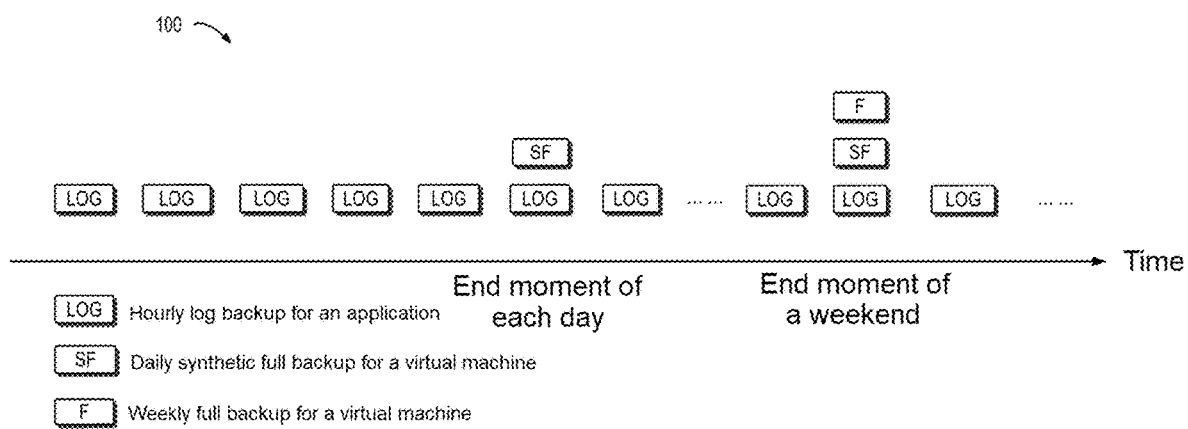
FIG. 1 illustrates a schematic diagram of an example of a backup task in the prior art.

As mentioned above, a user may configure a backup policy for a data object, and therefore, there are usually a plurality of types of backup tasks for the same data object. For example, for a virtual machine with an internal application (such as an SQL Server), a log (LOG) backup is performed for logs generated in the application once an hour, and a Synthetic Full (SF) incremental backup is performed on the virtual machine every day. Therefore, incremental or differential backups are required every day. Then, it is further required to perform a Full (F) backup of the virtual machine once a week. As shown in FIG. 1, the three types of backup tasks need to be continuously performed over time. At an end moment of each day, there will be twice as many backup tasks as usual, because hourly and daily backup tasks are triggered simultaneously. Moreover, at an end moment of a weekend, there will be three times as many backup tasks as usual, because hourly, daily, and weekly backups will be triggered.

For such backup method, much more work will be processed at the end of each day or weekend than usual, which may affect a customer's production environment multiple times. Further, the customer further needs additional hardware and capacity to handle peak workload, but most of the time the hardware and capacity are not needed. Therefore, such method causes resource waste and increases user costs.

At least to solve the above and other potential problems, the embodiments of the present disclosure provide a method for data backup. When backup operations are performed, a computing device first determines a group of backup tasks for backing up a data object. The computing device then uses backup types of the backup tasks to determine whether there are a plurality of backup tasks capable of being combined in the group of backup tasks. If there are a plurality of backup tasks capable of being combined in the group of backup tasks, the computing device determines a combined backup task. Then, the data object is backed up by using the combined backup task. This method can reduce the amount of data that needs to be backed up, thereby reducing the use of computing resources and storage resources, reducing the impact on a production environment of a user, and improving the user experience.

Figure 2:
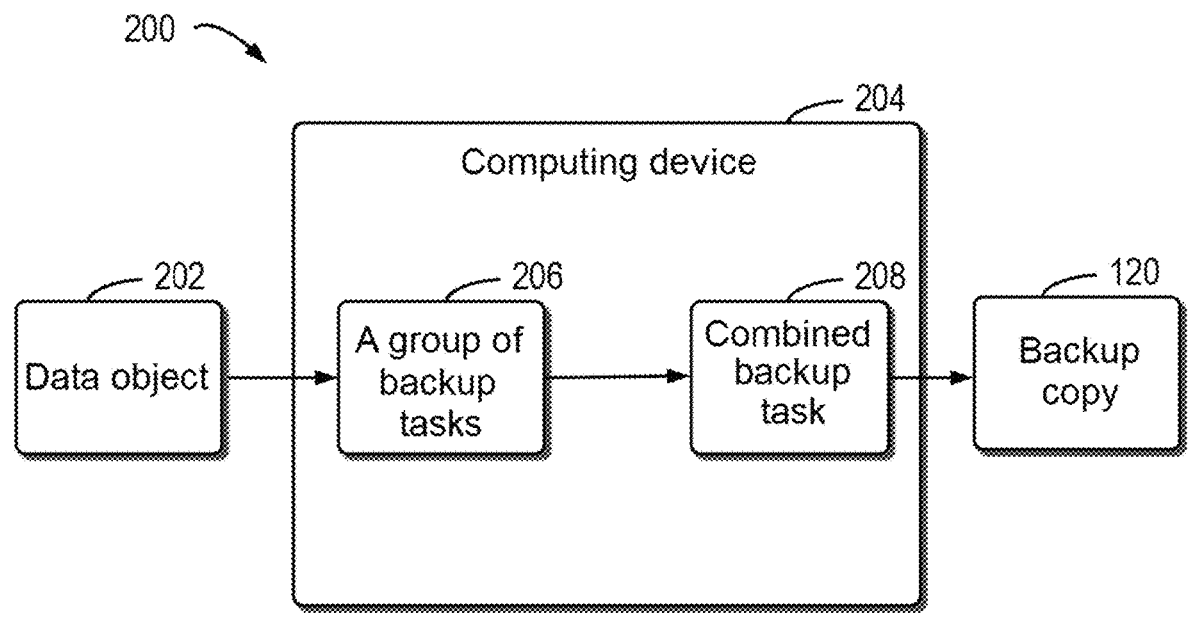
FIG. 2 illustrates a schematic diagram of an example environment in which a device and/or a method according to an embodiment of the present disclosure can be implemented.

The embodiments of the present disclosure will be further described in detail below with reference to the accompanying drawings, where FIG. 2 shows an example environment in which a device and/or a method according to an embodiment of the present disclosure can be implemented.

As shown in FIG. 2, an example environment 200 includes a computing device 204, and the computing device 204 performs backup tasks for a data object 202. An example computing device 204 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like.

The data object 202 may be any suitable data asset, such as data generated by a virtual machine, a container, or a computing device. To ensure data security, it is necessary to back up the data object. When backup operations are performed on the data object 202, a plurality of types of backup operations may be performed on the data object, such as weekly full backups, daily incremental or differential backups, and hourly log backups. It is shown in FIG. 2 that the data object 202 is located outside the computing device 204, which is only an example and not a specific limitation to the present disclosure. The data object 202 may also be located within the computing device 204.

The computing device 204 is configured to perform various types of backups on the data object 202. Therefore, a group of backup tasks 206 will be generated within the computing device 204. The group of backup tasks 206 need to perform different types of backups on the data object.

There may be duplicate backup tasks created simultaneously in the group of backup tasks 206, as these tasks may duplicate the backup data. For example, when there are both log backup tasks and synthetic full backup tasks or full backup tasks at the same time, the backed-up data is duplicated. Therefore, log backups are not required. In addition, when there are full backups or synthetic full backups at the same time, synthetic full backups are not required. Therefore, the computing device 204 determines that there are a plurality of duplicate backup tasks in the group of backup tasks, and then combines the plurality of backup tasks into a single combined backup task 208. The data object is then backed up through the combined backup task 208, and a backup copy 120 is generated. At this point, backup operations for a plurality of backup tasks may be completed by performing only one backup operation through a combined backup task.

This method can reduce the amount of data that needs to be backed up, thereby reducing the use of computing resources and storage resources, reducing the impact on a production environment of a user, and improving the user experience.

An example environment in which a device and/or a method according to an embodiment of the present disclosure can be implemented has been described above in FIG. 2. A schematic diagram illustrating an example of combining duplicate backup tasks according to an embodiment of the present disclosure is described below with FIG. 3.

Figure 3:
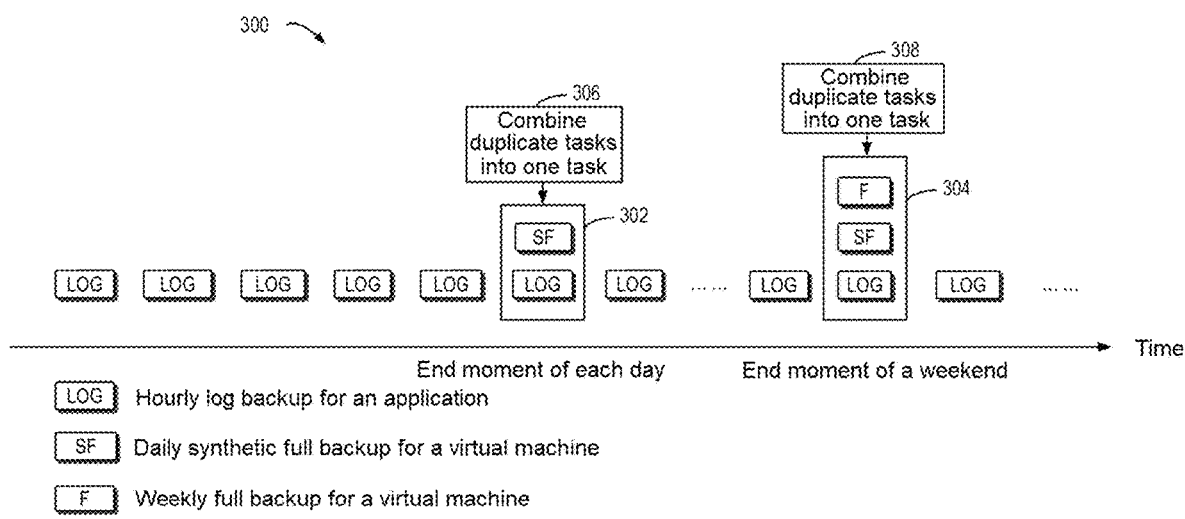
FIG. 3 illustrates a schematic diagram of an example of combining duplicate backup tasks according to an embodiment of the present disclosure.

As shown in an example 300 in FIG. 3, a user configures a backup plan in a backup policy for a virtual machine to protect the virtual machine. When there are a plurality of plans in the backup policy, a plurality of backup tasks may be performed simultaneously for the same data object. For example, hourly and daily backup tasks are performed at an end moment of each day, and hourly, daily, and weekly backup tasks are performed at an end moment of a weekend. These backup jobs may be duplicate backup jobs. To avoid unnecessary costs, duplicate backup jobs are merged. Therefore, at the end of each day, there is a group of backup tasks 302 including SF and LOG backup tasks. At this point, an operation in a block 306 may be performed to combine the duplicate tasks into one task. Similarly, at the end of a weekend, there will be a group of backup tasks 304 including F, SF, and LOG. At this point, an operation in a block 308 may be performed to combine the duplicate tasks into one task. Through the operations of blocks 306 and 308, the backup of the data object can be completed by performing one task.

This method can reduce the amount of data that needs to be backed up, thereby reducing the use of computing resources and storage resources, reducing the impact on a production environment of a user, and improving the user experience.

Figure 4:
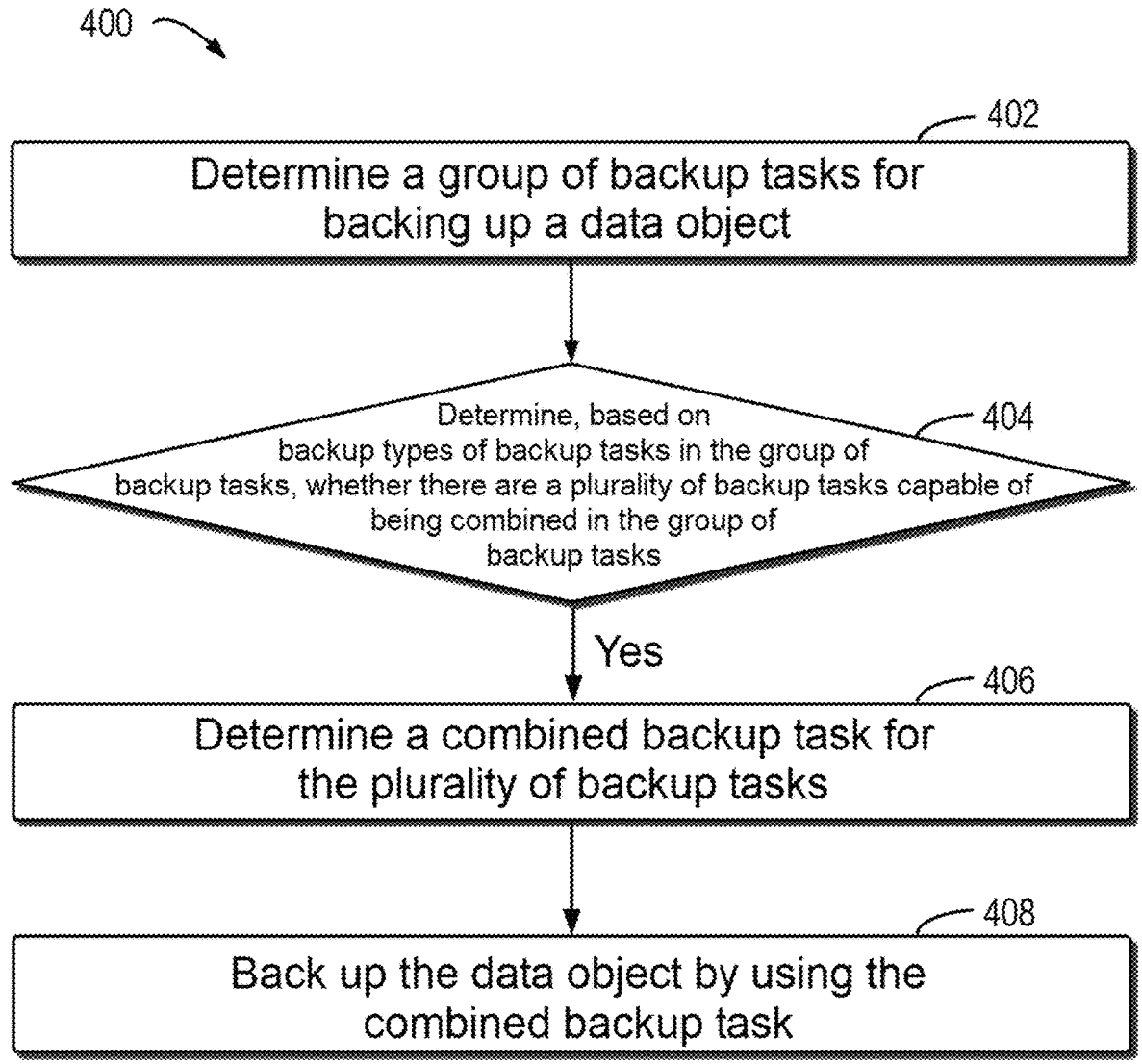
FIG. 4 illustrates a flow chart of a method for data backup according to an embodiment of the present disclosure.

The schematic diagram of an example of combining duplicate backup tasks according to an embodiment of the present disclosure is described above with reference to FIG. 3, and a flow chart of a method 400 for data backup according to an embodiment of the present disclosure is described below with reference to FIG. 4. The method in FIG. 4 may be performed on the computing device 204 in FIG. 2 or any suitable computing device.

At a block 402, a group of backup tasks for backing up a data object is determined. For example, depending on a backup policy for the data object, the computing device 204 may perform different types of backup tasks on the data object. Therefore, there may be a group of backup tasks at the same moment. As shown in FIG. 3, for backup tasks for a virtual machine, there will be LOG backups for applications in the virtual machine and SF backups for the virtual machine at an end moment of each day. At an end moment of a weekend, there will be LOG, SF, and F backup tasks.

At a block 404, it is determined, based on backup types of backup tasks in the group of backup tasks, whether there are a plurality of backup tasks capable of being combined in the group of backup tasks. For a group of backup tasks that occur simultaneously for the same data object, their backup types determine whether they may be merged, because the backup type determines the duplicate data. Therefore, in order to reduce the number of backup tasks performed, the computing device 204 may determine, based on the backup types of the backup tasks, which backup tasks are capable of being combined.

In some embodiments, when determining whether there are a plurality of backup tasks capable of being combined in the group of backup tasks, the computing device 204 first determines a backup type of one backup task in the group of backup tasks, and then determines a first content to be backed up corresponding to the backup task. Then, the computing device will further determine a backup type of another backup task in the group of backup tasks, and then determines a second content to be backed up corresponding to the another backup task. The computing device then determines whether the first content includes the second content or whether the first content is included in the second content. If the first content includes the second content or the first content is included in the second content, it is determined that the two backup tasks are capable of being combined. If the first content does not include the second content or the first content is not included in the second content, it indicates that the two backup tasks cannot be combined. Similarly, for other tasks, whether the tasks are capable of being combined is also determined in this way. In some embodiments, the computing device directly determines, based on task types for the same data object and according to a pre-determined relationship table of whether tasks between task types are capable of being combined, whether a group of backup tasks is capable of being combined. The above examples are only used for describing the present disclosure, and are not intended to specifically define the present disclosure. If there are no backup tasks capable of being combined in the group of backup tasks, the corresponding backup tasks are respectively performed according to existing methods.

If it is determined that there are a plurality of backup tasks capable of being combined in the group of backup tasks, at a block 406, a combined backup task for the plurality of backup tasks is determined. For example, if the computing device 204 determines a plurality of backup tasks capable of being combined, it may process the plurality of backup tasks to generate a combined backup task.

In some embodiments, when determining a combined backup task for the plurality of backup tasks, the computing device may determine, based on a backup type of each backup task of the plurality of backup tasks, a plurality of contents to be backed up. Then, a target backup content with the most data can be selected from the plurality of backup contents. At this point, the computing device may determine the backup type corresponding to the target backup content as the combined backup type of the combined backup task. In this way, a type of a backup task having the most backup content may be determined among the plurality of backup tasks, and the type may be determined as the combined backup type.

For example, for the above Full, Synthetic Full, and Log backup tasks, backup types thereof determine the duplicate data. For copies of two backup types, if data of the first copy is equal to or contains data of the second copy, it may be considered that the two backup types may be merged, and the backup type after the merge is the first backup type. Table 1 below lists types of backup tasks capable of being combined and combined backup types of the combined backup tasks.

TABLE 1

| Backup types capable of being combined | | |
|---|---|---|
| Backup task type | Whether they are capable of being combined | Combined backup type |
| Full & Full | Yes | Full |
| Full & Synthetic Full | Yes | Full |
| Full & Log | Yes | Full |
| Synthetic Full & Synthetic Full | Yes | Synthetic Full |
| Synthetic Full & Log | Yes | Synthetic Full |
| Log & Log | Yes | Log |

At a block 408, the data object is backed up by using the combined backup task. For example, the computing device 204 performs backup operations on the data object by using the combined backup task 208 with the combined backup type. Therefore, the combined backup task of the combined backup type may be used to perform a single backup to complete a plurality of backup tasks that need to be performed previously, thereby avoiding unnecessary costs and impacts on a production environment of a customer.

In some embodiments, when the data object is backed up by using the combined backup task, the computing device may further determine whether the combined backup task is successful. If determining that the combined backup task is successful, the computing device may generate a target copy corresponding to the combined backup task.

In some embodiments, the target copy generated by the combined backup task needs to be used for meeting requirements of a plurality of backup tasks. Therefore, some conditions need to be set for the target copy to meet the requirements of the plurality of backup tasks. For example, the computing device needs to maintain the target copy for a target duration, and the target duration meets a duration requirement for a copy of each backup task in the plurality of backup tasks. In other words, the target duration is at least the maximum duration for which the backup data of the plurality of backup tasks capable of being combined needs to be retained. Furthermore, the computing device further needs to perform strict retention locking on the target copy to prevent the target copy from being modified or adjusted during the target time period.

In some embodiments, the computing device may also utilize the target copy to generate copy metadata for each backup task of the plurality of backup tasks. The copy metadata is used for indicating a copy content corresponding to the backup task in the target copy, so that the plurality of backup tasks can all find their corresponding backup contents through the copy metadata.

In addition, when a plurality of duplicate backup tasks are merged into one task, there may be a backup failure. The method of combining backup tasks may reduce robustness. Because there is only one backup task after merging, while there are a plurality of backup tasks of different backup types before merging. The backup tasks of different backup types require different technologies and resources. Therefore, a success probability of at least one backup task among the plurality of backup tasks is higher than that of only one combined backup task. Even if some tasks fail, it may provide at least one data recovery point for a user. Therefore, a retry operation is required after the backup task fails.

In some embodiments, when the data object is backed up by using the combined backup task, and if it is determined that the combined backup task is unsuccessful, it is necessary to first determine a retry backup type of a backup task to be retried. The data object is then backed up by using the backup task with the retry backup type.

When the combined backup task fails, simply retrying is not helpful for robustness because using the combined backup type for retrying has a low probability of success. The previous backup job has failed, and retrying by using the same backup type within the same or closed time window is likely to fail again. Moreover, retrying all original backup tasks may bring about efficiency issues. This is because too many retries may bring a heavy burden to the backup system and cause the customer's environment to become worse. In order to effectively improve robustness issues and avoid the problem of further failures when retrying using the combined backup type, the retry backup type is different from the combined backup type of the combined backup task. Alternatively or additionally, the process may return to retry by using a new backup type in the original backup job.

In some embodiments, when determining the retry backup type for a backup task to be retried, the computing device first determines an error generated by the combined backup task. The computing device then determines the retry backup type based on the error. Because different backup types require different technologies and resources, switching to a new backup type for retrying will most likely bypass the previous backup error. Therefore, it is necessary to analyze the technology and required resources of an original backup type first. The technology and required resources of the backup type determine whether it can bypass the previous backup error. Table 2 below lists the technologies and required resources by using Full Backup, Synthetic Full Backup, and Log Backup as examples.

TABLE 2

Technologies and required resources for backup types

| Backup task type | Technologies and required resources |
| --- | --- |
| Full | Require virtual machine and application to quiesce<br>Require creation of a virtual machine snapshot<br>Require a long time and a large network bandwidth to upload complete data of the virtual machine to a backup storage |
| Synthetic Full | Depend on a previous full copy<br>Depend on Changed Block Tracking (CBT)<br>Upload only data that has changed based on the CBT (for example, 5% to 10% changed data) to the backup storage. If there is client deduplication, the backup of communication between the client and the backup storage is much less than all backup events. |
| Log | No need for the virtual machine and application to quiesce<br>Upload only application log data to a backup storage, instead of the entire virtual machine |

After the technology and required resources for each backup type are determined, a backup type to be retried may be selected based on the backup error. Therefore, it is necessary to select a new backup type that is most likely to bypass the previous backup error. Table 3 below lists reasons for backup errors and examples of selectable retry backup types.

TABLE 3

Select a retry backup type based on a backup error

| Error of a failed backup task | Backup type of a failed backup task | Retry backup type | Reason |
| --- | --- | --- | --- |
| Network or connection error during data transfer (such as network instability, low bandwidth, and network congestion) | Full | Synthetic Full | Synthetic Full uploads less data than Full |
| | Synthetic Full | Log | Log uploads less data than Synthetic Full |
| Insufficient backup storage space | Full | Log | Log requires less storage space than Full and Synthetic Full |
| | Synthetic Full | Log | Log requires less storage space than Full and Synthetic Full |
| Unable to create a snapshot for the virtual machine | Full | Log | Log does not require a snapshot to be created for the virtual machine |
| | Synthetic Full | Log | Log does not require a snapshot to be created for the virtual machine |
| No full copy of the virtual machine | Synthetic Full | Full | Promote a full copy when there is no full copy |
| Changed Block Tracking (CBT) error | Synthetic Full | Full | Full copy does not depend on the CBT |
| Unable to access applications in the virtual machine | Log | Synthetic Full | Virtual machine Synthetic Full does not require access to applications |

Therefore, the selected retry backup type may be used for automatically retrying the failed combined backup task. In some embodiments, the retry backup type is selected from the original backup job. For example, when the backup type to be retried is determined, a retry backup type is selected from a plurality of backup types corresponding to a plurality of backup tasks. If a new backup type fails to be selected, the process should return to retry by using the previous combined backup type.

Further, when the computing device performs backup by using a backup task having a retry backup type, the number of retries may further be counted. If the backup task having a retry backup type is unsuccessful, whether the number of retries exceeds a threshold number of times may be determined. If it exceeds, no further retries will be made. If the number of retries does not exceed the threshold number of times, a new retry backup type is determined.

This method can reduce the amount of data that needs to be backed up, thereby reducing the use of computing resources and storage resources, reducing the impact on a production environment of a user, and improving the user experience.

Figure 5:
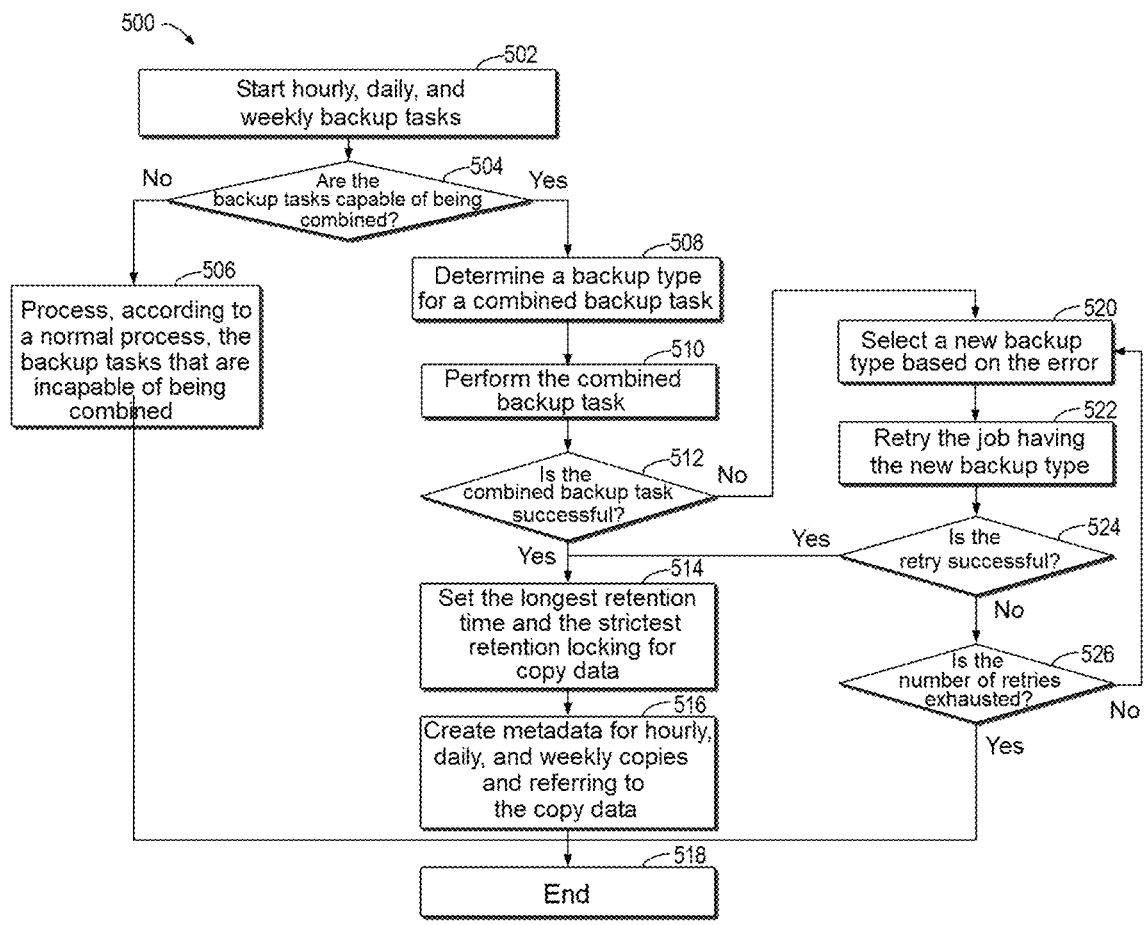
FIG. 5 illustrates a schematic diagram of an example method for backing up data according to an embodiment of the present disclosure.

The flow chart of the method 400 for data backup according to an embodiment of the present disclosure is described above with reference to FIG. 4, and a schematic diagram of an example method for backing up data according to an embodiment of the present disclosure is described below with reference to FIG. 5. The method in FIG. 5 may be performed on the computing device 204 in FIG. 2 or any suitable computing device.

At a block 502, a computing device starts hourly, daily, and weekly backup tasks. Next, at a block 504, the computing device determines whether the backup tasks are capable of being combined. If they are incapable of being combined, at a block 506, the backup tasks that are incapable of being combined are processed according to a normal process. If they are capable of being combined, at a block 508, the computing device determines a backup type for a combined backup task. As described above, one type may be selected from types of a plurality of backup tasks capable of being combined as the backup type for the combined backup task. Next, at a block 510, the computing device performs the combined backup task. At a block 512, the computing device determines whether the combined backup task is successful. If successful, at a block 514, the computing device sets the longest retention time and the strictest retention locking for copy data to ensure that the copy data can meet requirements of each backup task of the plurality of backup tasks capable of being combined. Next, at a block 516, the computing device creates metadata for hourly, daily, and weekly copies and referring to the copy data. In this way, the computing device may obtain hourly, daily, and weekly copies from the copy data through metadata. The operations then end at a block 518. If the computing device determines that the combined backup task is unsuccessful, at a block 520, the computing device selects a new backup type based on the error. For example, by analyzing the reason for the error, a new backup type that is different from the backup type of the combined backup task is selected to avoid failure again. Then, at a block 522, the computing device retries the job having the new backup type. Next, at a block 524, it is determined whether the retry is successful. If unsuccessful, it is determined at a block 526 whether the number of retries is exhausted. If exhausted, the operations end at a block 518. If not exhausted, the process returns to the block 520 to continue to retry. If the retry is successful at the block 524, the process returns to the block 514 to perform the operation.

This method can reduce the amount of data that needs to be backed up, thereby reducing the use of computing resources and storage resources, reducing the impact on a production environment of a user, and improving the user experience.

Figure 6:
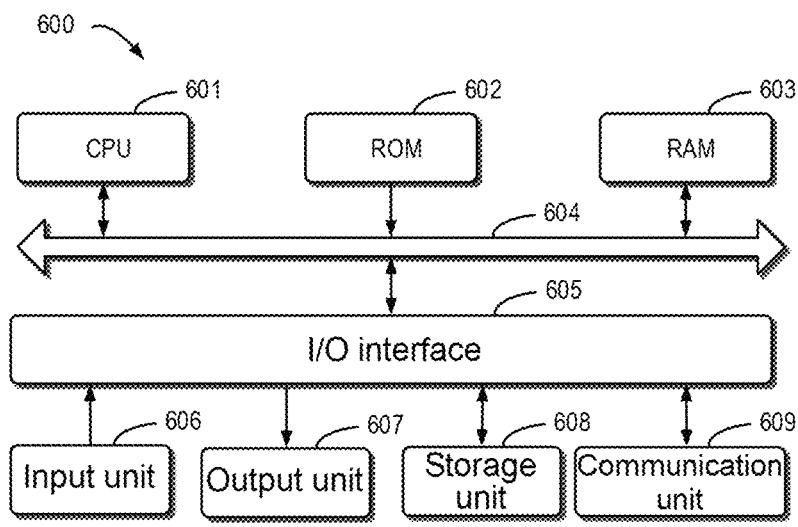
FIG. 6 illustrates a schematic block diagram of an example device suitable for implementing an embodiment of the present disclosure.

FIG. 6 illustrates a schematic block diagram of an example device 600 that may be used to implement embodiments of the present disclosure. The computing device 204 in FIG. 2 may be implemented by using the device 600. As shown in the figure, the device 600 includes a central processing unit (CPU) 601 that may execute various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in a RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage page 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

Various processes and processing described above, for example, processes or methods 400 and 500, can be performed by the processing unit 601. For example, in some embodiments, methods 400 and 500 may be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded into the RAM 603 and executed by the CPU 601, one or more actions of processes or methods 400 and 500 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

What is claimed:

1. A method for data backup, comprising:
   determining a first backup task, the first backup task to be performed at a first time, the first backup task having a first backup type, the first backup task associated with first data;
   determining a second backup task, the second backup task to be performed at the first time, the second backup task having a second backup type, the second backup task associated with second data;
   determining that the first data comprises the second data;
   determining, based on the first backup type and the second backup type, that the first backup task and the second backup task can be combined into a third backup task, the first backup task and the second backup task being duplicate tasks, and the third backup task having the first backup type;
   backing up the first data to backup storage using the third backup task;
   assigning a retention time to the first data, the retention time being a longer of the first backup task and the second backup task;
   creating first metadata associated with the first backup task, the first metadata comprising copy content associated with the first data;
   creating second metadata associated with the second backup task, the second metadata comprising copy content associated with the second data; and
   assigning retention locking to the first data, the retention locking preventing modification during the retention time.

2. The method according to claim 1, further comprising:
   determining, based on the first backup type, a first content to be backed up corresponding to the first backup task;
   determining, based on the second backup type, a second content to be backed up corresponding to the second backup task; and
   determining, in response to determining that the first content comprises the second content, that the first backup task and the second backup task can be combined.

3. The method according to claim 1, further comprising:
   determining, based on a backup type of each backup task of a group of backup tasks, a plurality of contents to be backed up;
   selecting a target backup content having a greatest quantity of data from the group of backup contents; and determining a backup type corresponding to the target backup content.

4. The method according to claim 1, further comprising:
determining whether the third backup task is successful; and
generating a target copy corresponding to the third backup task in response to determining that the third backup task is successful.

5. The method according to claim 4, further comprising:
maintaining the target copy for a target duration, the target duration meeting a duration requirement for a copy of the first backup type and the second backup type.

6. The method according to claim 4, further comprising:
generating, based on the target copy, copy metadata for a fourth backup task, the copy metadata being used for indicating a copy content corresponding to the fourth backup task in the target copy.

7. The method according to claim 4, further comprising:
determining, in response to determining that the third backup task is unsuccessful, a retry backup type of a backup task to be retried; and
backing up the first data and the second data by using a backup task having the retry backup type.

8. The method according to claim 7, wherein determining the retry backup type of a backup task to be retried comprises:
determining an error generated by the third backup task; and
determining the retry backup type based on the error.

9. The method according to claim 7, wherein the retry backup type is different from the third backup task.

10. The method according to claim 7, wherein determining the retry backup type comprises:
selecting the retry backup type from a plurality of backup types.

11. The method according to claim 7, further comprising:
determining whether a number of retries exceeds a threshold number in response to the backup task having the retry backup type is unsuccessful; and
determining a new retry backup type in response to that the number of retries exceeding the threshold number.

12. An electronic device, comprising:
at least one processor; and
a memory coupled to the at least one processor and having instructions stored thereon, wherein the instructions, when executed by the at least one processor, cause the electronic device to perform actions comprising:
determining a first backup task, the first backup task to be performed at a first time, the first backup task having a first backup type, the first backup task associated with first data;
determining a second backup task, the second backup task to be performed at the first time, the second backup task having a second backup type, the second backup task associated with second data;
determining, based on the first backup type and the second backup type, that the first backup task and the second backup task can be combined into a third backup task, the first backup task and the second backup task being duplicate tasks, the third backup task having the first backup type;
backing up the first data to backup storage using the third backup task;
assigning a retention time to the first data, the retention time being a longer of the first backup task and the second backup task;
creating first metadata associated with the first backup task, the first metadata comprising copy content associated with the first data;
creating second metadata associated with the second backup task, the second metadata comprising copy content associated with the second data; and
assigning retention locking to the first data, the retention locking preventing modification during the retention time.

13. The electronic device according to claim 12, wherein the actions further comprise:
determining, based on the first backup type, a first content to be backed up corresponding to the first backup task;
determining, based on the second backup type, a second content to be backed up corresponding to the second backup task; and
determining, in response to determining that the first content comprises the second content, that the first backup task and the second backup task can be combined.

14. The electronic device according to claim 12, wherein the actions further comprise:
determining, based on a backup type of each backup task of a group of backup tasks, a plurality of contents to be backed up;
selecting a target backup content having a greatest quantity of data from the plurality of contents; and
determining a backup type corresponding to the target backup content.

15. The electronic device according to claim 12, wherein the actions further comprise:
determining whether the third backup task is successful; and
generating a target copy corresponding to the third backup task in response to determining that the third backup task is successful.

16. The electronic device according to claim 15, wherein the actions further comprise:
maintaining the target copy for a target duration, the target duration meeting a duration requirement for a copy of the first backup type and the second backup type.

17. The electronic device according to claim 15, wherein the actions further comprise:
generating, based on the target copy, copy metadata for a fourth backup task, the copy metadata being used for indicating a copy content corresponding to the fourth backup task in the target copy.

18. The electronic device according to claim 15, wherein the actions further comprise:
determining, in response to determining that the third backup task is unsuccessful, a retry backup type of a backup task to be retried; and
backing up the first data and the second data by using a backup task having the retry backup type.

19. The electronic device according to claim 18, wherein determining the retry backup type of a backup task to be retried comprises:
determining an error generated by the third backup task; and
determining the retry backup type based on the error.

20. A computer program product, the computer program product being tangibly stored on a non-volatile computer-readable medium and comprising machine-executable instructions, wherein the machine-executable instructions, when executed, cause a machine to execute the following:

determine a first backup task, the first backup task to be performed at a first time, the first backup task having a first backup type, the first backup task associated with first data;

determine a second backup task, the second backup task to be performed at the first time, the second backup task having a second backup type, the second backup task associated with second data;

determine, based on the first backup type and the second backup type, that the first backup task and the second backup task can be combined into a third backup task, the first backup task and the second backup task being duplicate tasks, the third backup task having the first backup type;

back up the first data to backup storage using the third backup task;

assign a retention time to the first data, the retention time being a longer of the first backup task and the second backup task;

create first metadata associated with the first backup task, the first metadata comprising copy content associated with the first data;

create second metadata associated with the second backup task, the second metadata comprising copy content associated with the second data; and assign retention locking to the first data, the retention locking preventing modification during the retention time.

* * * * *